Dec. 9, 1924.
L. E. TAYLOR
1,518,945
PROCESS FOR COLORING MOTION PICTURE FILMS
Filed Dec. 8, 1923
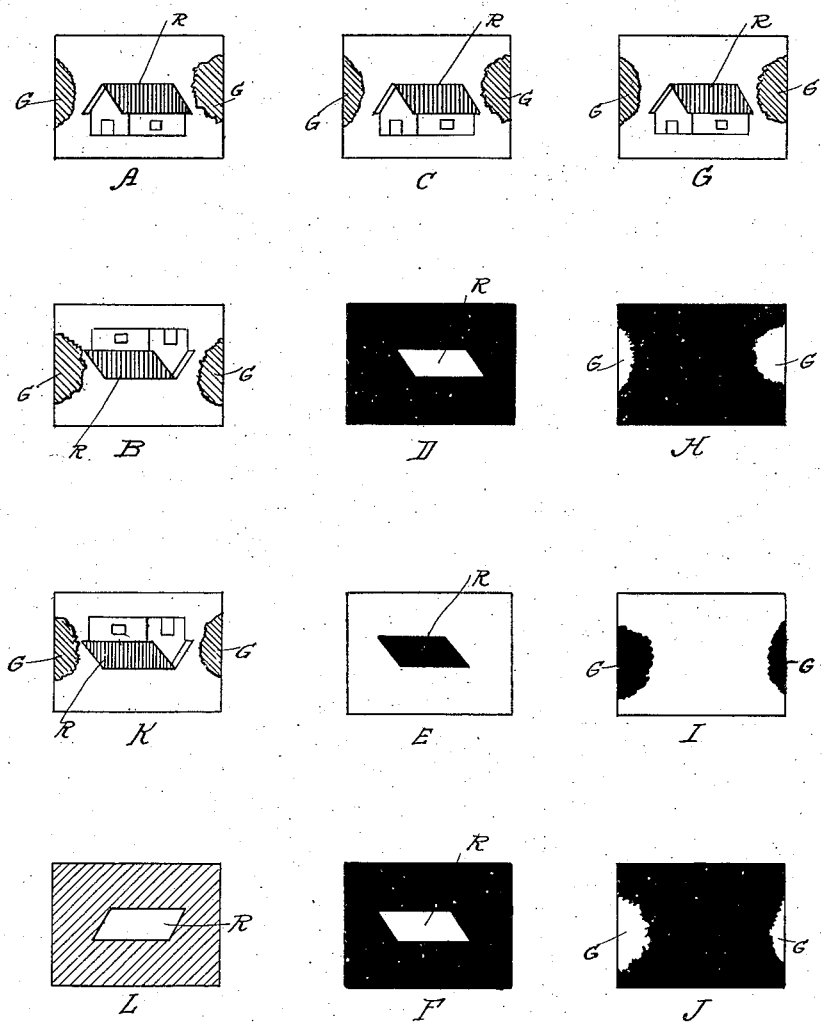
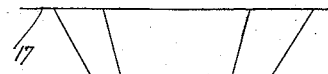
Inventor.
Loren. E. Taylor.
by
his Attorney.

Patented Dec. 9, 1924.

1,518,945

UNITED STATES PATENT OFFICE.

LOREN E. TAYLOR, OF LOS ANGELES, CALIFORNIA, ASSIGNOR TO FAMOUS PLAYERS-LASKY CORPORATION, OF NEW YORK, N. Y., A CORPORATION OF NEW YORK.

PROCESS FOR COLORING MOTION-PICTURE FILMS.

Application filed December 8, 1923. Serial No. 679,340.

*To all whom it may concern:*

Be it known that I, LOREN E. TAYLOR, a citizen of the United States, and a resident of Los Angeles, in the county of Los Angeles and State of California, have invented new and useful Improvements in Processes for Coloring Motion-Picture Films, of which the following is a specification.

This invention relates generally to processes for coloring motion picture films and particularly to the application of coloring matter, such as aniline dyes and the like, directly to the finished positive prints, so they may be projected in colors, in any standard projector, without the aid of color filters or any special attachments.

The present process is closely allied with the invention covered by United States Letters Patent No. 1,303,837, granted May 13, 1919, wherein coloring matter is applied directly to finished positive prints by subjecting them to a pressurable contact with similar films carrying color matter; the two being, for this purpose, rolled in facial contact for a sufficient length of time to permit absorption of coloring matter by one from the other, while at the same time a longitudinal tension is exerted upon each of the films, independently, to bring them into registering dimensions during their mobile contact.

Specifically, the instant case deals with the production of the coloring carrying films—hereinafter termed "print plates"—photographically; the foremost object being to simplify the production of these plates to a point of commercial practicability and economy.

In the production of print plates of this character, while they may be produced in other ways, it is preferable that they be prints or facsimiles of the original negative or positive to be colored, in order that the several views or images therein may serve as bases for the application of the coloring matter, which will more or less perfectly register with the corresponding portions of similar views of the finished positive. Therefore, as will be more fully hereinafter explained, the print plates in this case are made from prints of the original negative and positive, thereby simplifying and economizing production.

In the accompanying drawings I have illustrated diagrammatically several of the steps in my process.

In the drawings,

Figure 1 illustrates diagrammatically a series of views proceeding from the original exposure to the finished print plates; and Fig. 2 illustrates diagrammatically a form of apparatus suitable for carrying out several of the steps of the process.

This process is adaptable alike to the application of one or more colors directly to the finished positive print or film, which is made ready for exhibition and projection onto a screen. While some of the steps in the process are manual, a number of them are carried out photographically, by usual and well known photographic processes, except where, as will later appear, I have introduced new methods and steps into the art.

The films I use in carrying out my process, where the same are designated "original negative" or "original positive," may be either the original negative produced by exposure in the camera or one taken by printing back from a positive print thereof, and the positive print may be a reverse facsimile of the original negative produced in any manner. As the original negative produced in the camera is ordinarily preserved, the "original negative" used in my process will usually be a duplicate.

Referring first to Fig. 1, the diagram A represents the scene photographed in which the roof of the house R is of red tile and the foliage G is green. If it is desired to color the roof R red and the foliage G green, two separate print plates will be produced, one with red dye and the other green, so that when they are successively brought into pressurable facial contact with the positive print, it will absorb these different colors in proportion to its photographic values. Ordinarily, where but two print plates are produced, such as red and green, one will carry an orange-red dye and the other blue-green dye, as practically all predominating colors in a scene may be produced with this combination.

The diagram B represents the impression of the scene of diagram A upon the original negative, exposed in a camera; this view being arranged so the reader is looking at it from the celluloid side, so that it is in the usual inverted position. A positive print is taken from the negative shown in diagram B, and as such prints are usually made with the emulsion side of the positive next to the emulsion side of the negative, the view of the resulting positive print will also appear as in the diagram B when the reader is looking at its emulsion side. This positive print is the one which will be finally exhibited by projection onto a screen, it being well understood that in projecting the view will be again inverted so that it will appear on the screen as in the diagram A.

In the following description I will refer to the "negative B" and the "positive B," meaning either the original negative as shown in diagram B, or the original positive print taken therefrom, which is also the same as diagram B when looking at its emulsion side.

Either the negative or positive B is placed in a camera which may be arranged particularly for this purpose, one form of which I will hereinafter explain, and is projected onto a small screen or board, the projected view being shown in the diagram C, which, of course, is identical with the diagram A, illustrating the original scene photographed. The board or screen onto which the view C is projected is covered with a black mat, preferably black cardboard or mat of non-actinic color, so that any number of successive views may be reproduced in the print plate. In projecting the positive B onto the board its views are projected in proper sequence, the same as they would be projected onto a screen during final exhibition; and for each scene of the positive B a separate card is produced, as shown in diagram D. It may be here noted that the diagrams C. D. E and F represent the several steps in producing the red print plates, while the diagrams G, H, I and J represent similar steps in producing the green print plate.

When the view C is projected onto the black mat, a drawing is made on it in white, or some actinic color, of the portion or portions of the view it is desired to produce in one color, the projected view furnishing the proper outline to guide the artist and furnish proper relative positions and proportions. In this case the roof R is produced in white on the black background, which, when finished will appear as in diagram D. After each of the successive views of the positive have been thus projected in proper sequence, each on a separate mat and a drawing made of each one, the positive print B is removed from the camera and replaced by an unexposed negative film. The cards shown in diagram D are then placed in numerical order, that is, in the same sequence as originally produced, and each one then separately exposed to the negative, which, when developed, will carry successive views, as shown in diagram E. That is, the area R of its sensitized surface, being the only portions affected by the exposure will be substantially opaque, while the remaining portions of each exposure, corresponding to the black background of the card D, will be clear, the gelatinous surface thereover having been removed in the developing process.

I may here mention that the camera in which the positive B is projected onto the board and in which the negative E is subsequently exposed, will be fixed relative to the board D during these operations, so the resultant print plates will register with the finished positive. Also, it will be provided with the usual stop mechanism in order that successive views may be intermittently projected for the making of white views on the black background, as shown in diagram D, and also for proper exposure of the negative E.

In projecting the positive B onto the board to produce the view C, as shown, the emulsion side of the positive will be towards the light in the camera, provided the positive has been produced from the negative with its emulsion side next to the emulsion side of the negative; but in case the positive is produced by printing with its celluloid side next to the emulsion side of the negative, its emulsion side will be away from the light in the camera when projecting the view C. In other words, the view C is to correspond with the original scene A, but as these operations are carried out in the laboratory, the workmen may not be familiar with the original scene, and for that reason these steps may be kept in mind. The rule may also be stated: The view C will be produced by projecting the positive B, with its side towards the light which was next to the negative B in printing.

The diagram E represents the negative produced by exposure to the drawing shown in diagram D, and its position is as it would appear to the reader looking at it from its celluloid side; therefore, the exposed portion R is in inverted position relative to the corresponding portion R of the diagram D.

A positive print, shown in diagram F, is then made of the negative E, by printing the positive therefrom with its celluloid side in contact with the emulsion side of the negative. The diagram F represents this positive looking at it from its celluloid side, and for this reason its area R is in a position corresponding with the area R in the negative E. As the area R of positive F has not been exposed to light in printing, this portion of its sensitized coating or emulsion side will be practically clear, while the remaining area of the view, which was exposed to light, will be substantially opaque. Thus we have in the positive F a series of successive views—exposed in proper sequence by exposure of the negative E to the drawings D, in proper order—in which the areas R are clear and the remainder of each view substantially opaque.

It is to be further noted, that in case the position B has been produced by printing from the negative B with its celluloid side in contact with the emulsion side of the negative, its views will appear as in diagram K, when looking at its emulsion side; that is turned around. As such a film would have to be run in the projecting apparatus with its celluloid side towards the light to produce the projected view C; the positive F would be produced by printing from the negative E with its emulsion side next the emulsion side of the negative. When looking at its celluloid side the views would appear as in diagram L. Thus its area R will register with the area R of diagram K.

After the negative F has been thus produced it is immersed in a chemical solution, such as is explained in my co-pending application Serial No. 646,471, filed June 19th, 1923, including typically, water 8 fluid oz., hydrogen peroxide (ten vol. 3%), 8 fluid oz.; copper sulphate 120 grains and sulphuric acid 2 minims; which etches out and removes those portions of each view which are exposed to light in printing from the negative E, or which will solidify those exposed portions sufficiently to render them substantially impervious to moisture. In case these exposed portions are etched out, the gelatinous coating will be entirely removed by the etching process leaving only the celluloid surface surrounding the area R, while this area R composed of the clear gelatinous coating of the film, remains. This gelatinous coating extending over the area R, and which was not exposed to light in printing from the negative E, remains soft and capable of absorbing moisture.

After thus treating the positive F it is immersed in a suitable coloring solution, such as aniline dyes or the like, for a sufficient length of time to permit the areas R to absorb a quantity of this coloring matter. After this step the positive F will have substantially the appearance of the negative shown in diagram E, looking at it from its celluloid side, except that the area R of positive F will be the portion carrying the red dye, while the surrounding portion will be of clear celluloid, in case the etching process has been used, or of solidified gelatin upon the celluloid in case the hardening step has been used.

After thus producing the positive print plate F, it is then rolled in contact with the positive B for a sufficient length of time to permit the coloring matter to be absorbed by the gelatinous coating of the latter on its corresponding portion K. As the reader is looking at the positive F from the celluloid side it is clear that the area R will register perfectly with the corresponding area of the positive B when the two are brought into facial contact, it being remembered that the reader is looking at the emulsion side of the positive B.

As hereinbefore stated the diagrams G, H, I and J represent the steps in producing the green print plate, which are the same as those followed in producing the red print plate, shown in diagrams C, D, E and F; the only difference being that the view G, which is the same as view C, is thrown onto the black background and the areas G painted on the latter in white, as shown in diagram H. Diagram I represents a negative produced by exposure of a negative film in the camera to the board of diagram H, while diagram J is a positive print of the negative I produce the same as negative E and positive F.

When the illustrations used in connection with the foregoing description are shown to be still subjects, it is obvious that moving figures, occupying different positions in successive views, may be colored in the same manner, as a separate drawing is made for each successive view of the positive print, and then exposed to a negative in the same order in which they were produced. Also, while the foregoing description has been confined to the application of substantially flat colors, half tone effects may be produced or the color lightened by stippling these half tone areas in white on the cards or black backgrounds of diagrams D and H. As the views projected onto the black backgrounds, are considerably enlarged by projection, this work can be carried on very rapidly and extremely accurate results produced, at a comparatively small cost, even where the areas of the final positives to be colored are very minute.

In Fig. 2 I have illustrated a form of apparatus which may be used in carrying out the steps of my process above described. In this figure the numeral 10 designates a camera box having the usual camera lens 11 therein. Such a camera would be equipped with the usual shutter and stop movement, which is well known and need not be here described. This intermittent movement carries and actuates the film 12 back of the lens 11. A reflecting prism 13 may be mounted back of the film 12 and a lamp 14 in a housing 15, on the side of the box 10, supplies the light for projecting through a collector lens 16; the light being reflected by the prism 13 through the film 12 and camera lens 11, projecting the views onto the board 17 to which the black cards are secured. When the negative is being exposed in the camera the light 14 may be turned off or a suitable shutter may be provided over the collector lens 16.

In the following claims where I use the term "final positive" it is to be construed as meaning the positive print to be colored for final exhibition by projection onto a screen. As my invention is not limited to the particular apparatus for carrying it out, variations in this arrangement may be made if found practicable.

Having described my invention, I claim:

1. The process of coloring motion picture films comprising taking a positive print from an original negative by printing with their emulsion sides in contact, projecting successive views of said positive each onto a mat of non-actinic color in sequence, the emulsion side of said positive being toward the projecting light, making drawings on said mats in actinic color on the areas of said views it is desired to tint with one color, thence exposing successive portions of an unexposed negative film to each of said mats so the successive drawings will be impressed thereon in the sequence in which they were produced, developing said negative and taking a positive print therefrom by printing with the celluloid side of the positive in contact with the emulsion side of the negative, developing said positive and treating it so the emulsion over the areas thereon corresponding to those of the drawings will absorb moisture and the remaining areas will be impervious thereto, applying dye to said absorbent areas, thence subjecting said positive to a pressurable contact with the original positive, while in register therewith and with their emulsion sides in contact.

2. The process of coloring motion picture films comprising taking a positive print from an original negative by printing with the celluloid side of the positive in contact with the emulsion side of the negative, projecting successive views of said positive each onto a mat of non-actinic color in sequence, the celluloid side of said positive being toward the projecting light, making drawings on said mats in actinic color on the areas of said views it is desired to tint with one color, thence exposing successive portions of an unexposed negative film to each of said mats so the successive drawings will be impressed thereon in the sequence in which they were produced, developing said negative and taking a positive print therefrom by printing with their emulsion sides in contact, developing said positive and treating it so the emulsion over the areas thereon corresponding to those of the drawings will absorb moisture and the remaining areas will be impervious thereto, applying dye to said absorbent areas, thence subjecting said positive to a pressurable contact with the original positive, while in register therewith and with their emulsion sides in contact.

In witness that I claim the foregoing I have hereunto subscribed my name this 2nd day of November, 1923.

LOREN E. TAYLOR.